United States Patent
Bae et al.

(10) Patent No.: US 11,086,447 B2
(45) Date of Patent: Aug. 10, 2021

(54) ELECTRONIC DEVICE AND METHOD FOR CONTROLLING TOUCH SENSOR CONTROLLER ON BASIS OF IMAGE SYNCHRONIZATION SIGNAL

(71) Applicant: Samsung Electronics Co., Ltd., Gyeonggi-do (KR)

(72) Inventors: Jongkon Bae, Gyeonggi-do (KR); Donghui Kim, Gyeonggi-do (KR); Seunghoon Ko, Gyeonggi-do (KR); Wooyoung Oh, Gyeonggi-do (KR); Dongkyoon Han, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/956,748

(22) PCT Filed: Dec. 17, 2018

(86) PCT No.: PCT/KR2018/016020
§ 371 (c)(1),
(2) Date: Jun. 22, 2020

(87) PCT Pub. No.: WO2019/124908
PCT Pub. Date: Jun. 27, 2019

(65) Prior Publication Data
US 2021/0055848 A1    Feb. 25, 2021

(30) Foreign Application Priority Data
Dec. 20, 2017   (KR) ........................ 10-2017-0176371

(51) Int. Cl.
*G06F 3/041*    (2006.01)
*G09G 3/20*    (2006.01)

(52) U.S. Cl.
CPC ........... *G06F 3/04166* (2019.05); *G09G 3/20* (2013.01); *G06F 3/0412* (2013.01); *G06F 3/0416* (2013.01)

(58) Field of Classification Search
CPC .. G06F 3/0412; G06F 3/0416; G06F 3/04166; G06F 3/04184; G06F 3/04186; G06F 3/044; G09G 3/20
(Continued)

(56) References Cited

U.S. PATENT DOCUMENTS

| 9,164,641 B1 * | 10/2015 | Rowe ................. G06F 3/04184 |
| 2013/0335366 A1 | 12/2013 | Lee et al. |
| 2014/0368467 A1 | 12/2014 | Park |
| 2015/0062081 A1 | 3/2015 | Lee et al. |

(Continued)

FOREIGN PATENT DOCUMENTS

| KR | 1020150026040 | 3/2015 |
| KR | 1020160032768 | 3/2016 |

(Continued)

OTHER PUBLICATIONS

PCT/ISA/210 Search Report issued on PCT/KR2018/016020, dated May 13, 2019, pp. 7.

(Continued)

*Primary Examiner* — Tom V Sheng
(74) *Attorney, Agent, or Firm* — The Farrell Law Firm, P.C.

(57) ABSTRACT

An electronic device according to various embodiments may comprise: a display driving integrated circuit (DDIC) operably coupled to a display panel; and a touch sensor controller operably coupled to the display driving integrated circuit and operably coupled to a touch panel, wherein the display driving integrated circuit may be configured to: multiple-transmit a synchronization signal for synchronizing an operation of the display driving integrated circuit with an operation of the touch sensor controller to the touch sensor (Continued)

controller within one frame on the basis of a first transmission mode when the display panel is controlled on the basis of a first frame rate; and multiple-transmit the synchronization signal to the touch sensor controller within the frame on the basis of a second transmission mode when the display panel is controlled on the basis of a second frame rate. Here, time intervals between the multiple transmissions on the basis of the first transmission mode may be the same, and among time intervals between the multiple transmissions on the basis of the second transmission mode, a first time interval between a first transmission and a second transmission subsequent to the first transmission may be different from the other time intervals, except the first time interval, among the multiple transmissions on the basis of the second transmission mode.

15 Claims, 10 Drawing Sheets

(58) Field of Classification Search
USPC .......................................................... 345/173
See application file for complete search history.

(56) References Cited

U.S. PATENT DOCUMENTS

| 2016/0077617 | A1 | 3/2016 | Lee | |
|---|---|---|---|---|
| 2016/0098114 | A1* | 4/2016 | Pylvas | G06F 3/04166 345/174 |
| 2016/0179273 | A1* | 6/2016 | Lee | G09G 5/00 345/174 |
| 2016/0188115 | A1 | 6/2016 | Seo | |
| 2017/0147143 | A1 | 5/2017 | Jung | |
| 2018/0239459 | A1 | 8/2018 | Ahn | |
| 2019/0317630 | A1* | 10/2019 | Shaw | G06F 3/0412 |

FOREIGN PATENT DOCUMENTS

| KR | 1020160078745 | 7/2016 |
|---|---|---|
| KR | 1020170060197 | 6/2017 |
| WO | WO2013058446 | 4/2013 |
| WO | WO2017034289 | 3/2017 |

OTHER PUBLICATIONS

PCT/ISA/237 Written Opinion issued on PCT/KR2018/016020, dated May 13, 2019, pp. 10.

* cited by examiner

ELECTRONIC DEVICE AND METHOD FOR CONTROLLING TOUCH SENSOR CONTROLLER ON BASIS OF IMAGE SYNCHRONIZATION SIGNAL

PRIORITY

This application is a National Phase Entry of International Application No. PCT/KR2018/016020, which was filed on Dec. 17, 2018, and claims priority to Korean Patent Application No. 10-2017-0176371, filed in the Korean Intellectual Property Office on Dec. 20, 2017, the content of each of which is incorporated herein by reference.

TECHNICAL FIELD

Various embodiments described below relate to an electronic device and a method for controlling transmission of a synchronization signal related to a touch sensor controller, based on an image synchronization signal.

BACKGROUND ART

Electronic devices, such as a smartphone, a tablet personal computer (PC), and a smartwatch, may output various kinds of content through a display panel. The electronic devices may include a touch panel to recognize a touch input for intuitive interactions between a user and the electronic devices. The electronic devices may detect a touch input through the touch panel with content displayed through the display panel.

DISCLOSURE OF INVENTION

Technical Problem

An electronic device may detect a touch input through a touch panel with content displayed through a display panel. Since the touch input may be related to the content, a method for synchronizing a display driving integrated circuit (DDIC) operably coupled to the display panel with a touch sensor controller operably coupled to the touch panel may be required.

Various embodiments to be illustrated may provide an electronic device and a method for controlling a synchronization signal transmitted from the display driving integrated circuit to the touch sensor controller for synchronization between the display driving integrated circuit and the touch sensor controller.

Technical tasks to be accomplished in the disclosure may not be limited to the above-mentioned technical tasks, and other technical tasks which are not mentioned may be clearly understood, through the following descriptions, by those skilled in the art to which the disclosure pertains.

Solution to Problem

An electronic device according to various embodiments may include: a display driving integrated circuit (DDIC) configured to be operably coupled to a display panel; and a touch sensor controller configured to be operably coupled to the display driving integrated circuit and to be operably coupled to a touch sensor, wherein the display driving integrated circuit may be configured to: perform multiple transmissions of a synchronization signal for synchronizing an operation of the display driving integrated circuit with an operation of the touch sensor controller to the touch sensor controller within one frame, based on a first transmission mode when the display panel is controlled based on a first frame rate; and perform multiple transmissions of the synchronization signal to the touch sensor controller within the frame, based on a second transmission mode when the display panel is controlled based on a second frame rate. Here, time intervals between the multiple transmissions based on the first transmission mode may be the same, and a first time interval between a first transmission and a second transmission subsequent to the first transmission among the multiple transmissions based on the second transmission mode may be different from remaining time intervals excluding the first time interval among time intervals between the multiple transmissions based on the second transmission mode.

An electronic device according to various embodiments may include: a touch sensor controller configured to be operably coupled to a touch sensor; a display driving integrated circuit configured to be operably coupled to the touch sensor controller and a display panel; a synchronization signal generator configured to generate at least one synchronization signal associated with the touch sensor controller and to be associated with the display driving integrated circuit; and a processor configured to be operably coupled to the display driving integrated circuit, wherein the synchronization signal generator may be configured to transmit the at least one synchronization signal to the touch sensor controller every specified period, the processor may be configured to detect an input to change a driving mode of the display panel and to transmit a control signal to initialize the display driving integrated circuit to the display driving integrated circuit upon detecting the input, the display driving integrated circuit may be configured to initialize the display driving integrated circuit, based on the control signal, and the synchronization signal generator may be further configured to maintain transmission of the at least one synchronization signal to the touch sensor controller every specified period while initializing the display driving integrated circuit.

A method for an electronic device according to various embodiments may include: performing, using a display driving integrated circuit of the electronic device, multiple transmissions of a synchronization signal for synchronizing an operation of the display driving integrated circuit with an operation of a touch sensor controller of the electronic device to the touch sensor controller within one frame, based on a first transmission mode when a display panel of the electronic device is controlled based on a first frame rate; and performing, using the display driving integrated circuit, multiple transmissions of the synchronization signal to the touch sensor controller within the frame, based on a second transmission mode when the display panel is controlled based on a second frame rate using the display driving integrated circuit, wherein time intervals between the multiple transmissions based on the first transmission mode may be the same, and a first time interval between a first transmission and a second transmission subsequent to the first transmission among the multiple transmissions based on the second transmission mode may be different from remaining time intervals excluding the first time interval among time intervals between the multiple transmissions based on the second transmission mode.

A method for an electronic device according to various embodiments may include: transmitting, by a synchronization signal generator of the electronic device, at least one synchronization signal to a touch sensor controller of the electronic device every specified period; detecting, by a processor of the electronic device, an input to change a driving mode of a display panel; transmitting, by the processor, a control signal to initialize a display driving integrated circuit of the electronic device to the display driving integrated circuit upon detecting the input; initializing, by the display driving integrated circuit, the display driving integrated circuit, based on the control signal; and maintaining, by the synchronization signal generator, transmission of the at least one synchronization signal to the touch sensor controller every specified period while initializing the display driving integrated circuit.

Advantageous Effects of Invention

An electronic device and a method therefor according to various embodiments may control transmission of a synchronization signal from a display driving integrated circuit to a touch sensor controller, thereby synchronizing the display driving integrated circuit and the touch sensor controller.

The effects obtainable from the disclosure are not limited to the effects mentioned above, and other effects not mentioned will be clearly understood by those skilled in the art from the following description.

BEST MODE FOR CARRYING OUT THE INVENTION

Figure 1:
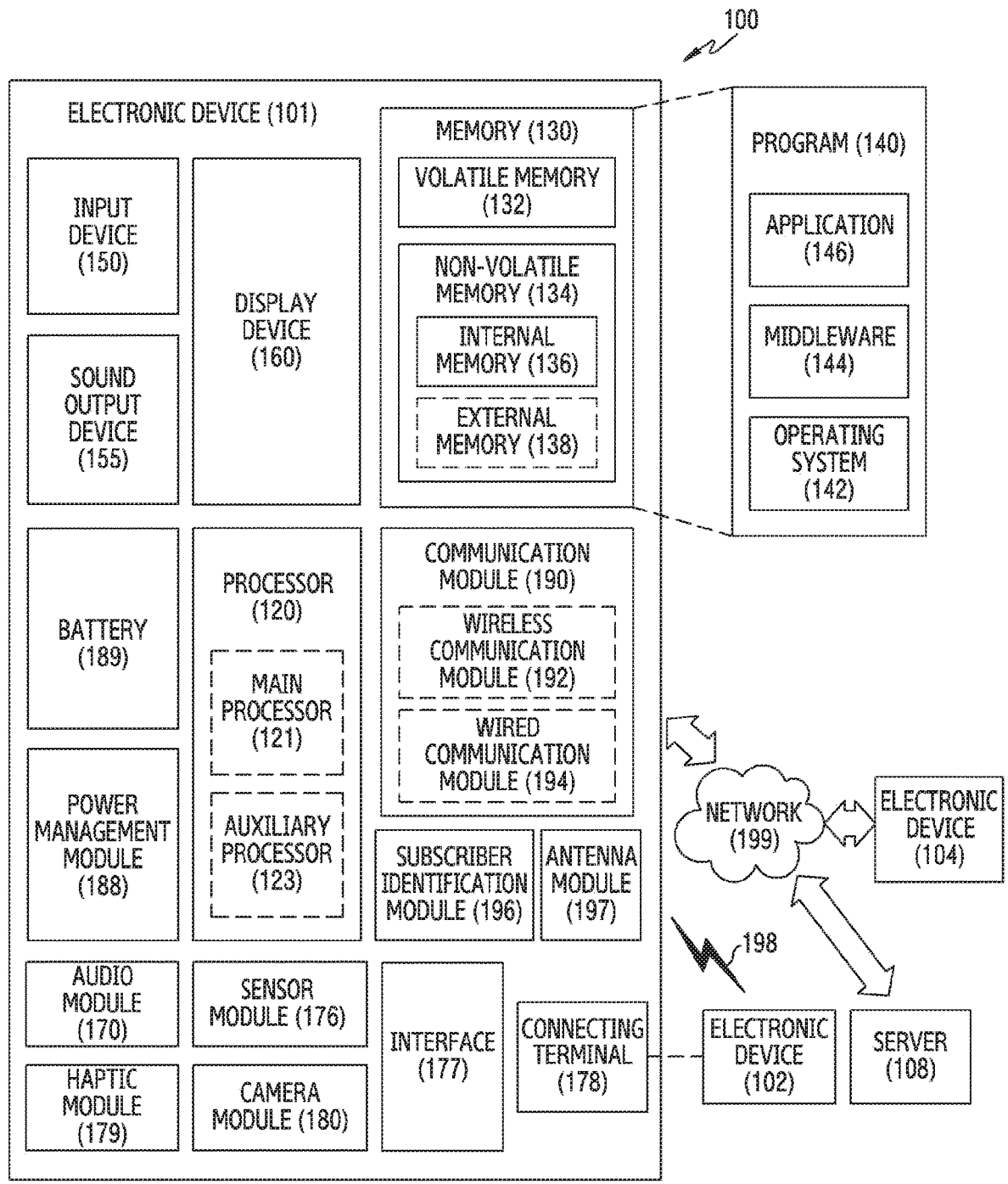
FIG. 1 is a block diagram illustrating an electronic device in a network environment, which is for controlling a touch sensor controller, based on an image synchronization signal according to various embodiments.

FIG. 1 is a block diagram illustrating an electronic device in a network environment, which is for controlling a touch sensor controller, based on an image synchronization signal according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
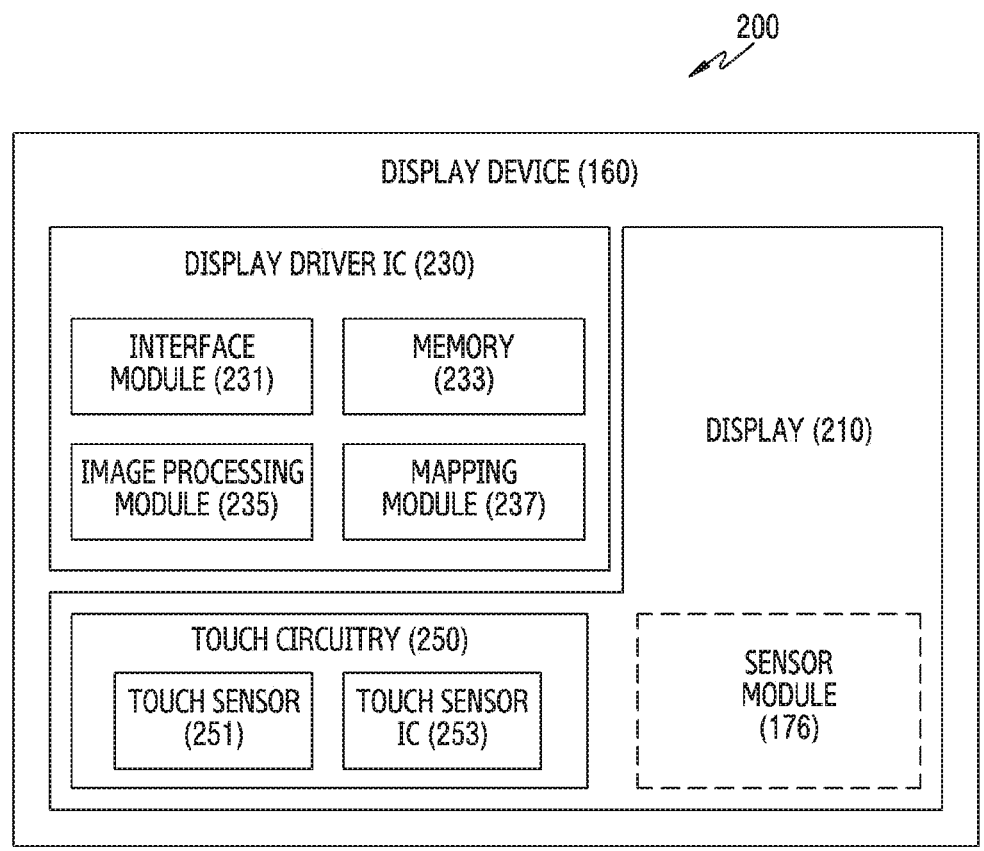
FIG. 2 is a block diagram illustrating a display device, which is for controlling a touch sensor controller, based on an image synchronization signal according to various embodiments.

FIG. 2 is a block diagram illustrating a display device, which is for controlling a touch sensor controller, based on an image synchronization signal according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
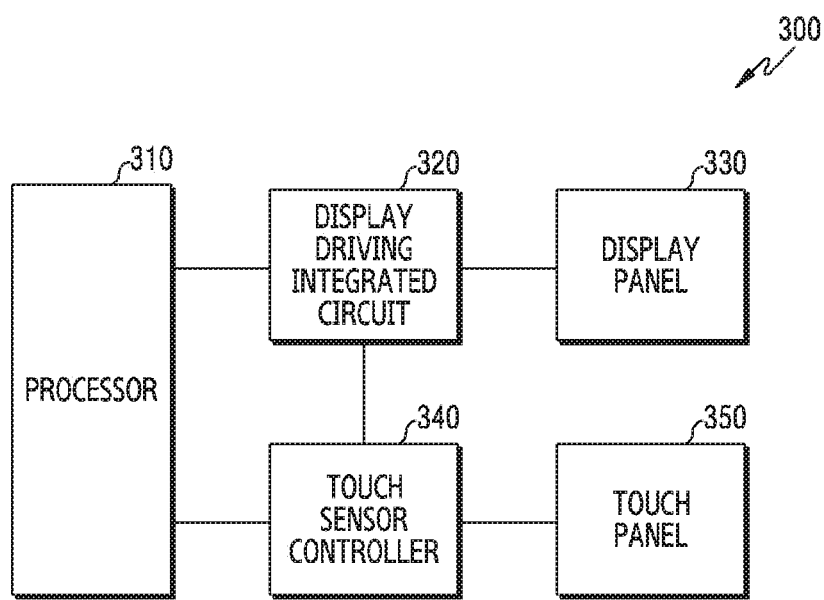
FIG. 3 illustrates an example of a functional configuration of an electronic device according to various embodiments.

FIG. 3 illustrates an example of a functional configuration of an electronic device according to various embodiments.

Referring to FIG. 3, the electronic device 300 may include a processor 310, a display driving integrated circuit 320 (e.g., a display driver IC 230), a display panel 330, a touch sensor controller 340, and a touch panel 350 (e.g., a touch sensor).

The processor 310 may include the processor 120 illustrated in FIG. 1, the display driving integrated circuit 320 may include the display driver IC 230 illustrated in FIG. 2, the display panel 330 may include the display 210 illustrated in FIG. 2, the touch sensor controller 340 may include one or more of the touch sensor 251 illustrated in FIG. 2 or the touch sensor IC 253 illustrated in FIG. 2, and the touch panel 350 may include one or more of the touch sensor 251 illustrated in FIG. 2 or the touch sensor IC 253 illustrated in FIG. 2.

In various embodiments, the processor 310 may transmit a control signal to control the display driving integrated circuit 320 or the display panel 330 to the display driving integrated circuit 320. For example, the processor 310 may transmit the control signal to change a frame rate used to display or output content through the display panel 330 to the display driving integrated circuit 320. In various embodiments, the frame rate may change according to the state of the display panel 330. For example, when the state of a screen displayed on the display panel 330 continuously changes, the processor 310 may configure or set the frame rate to a first frame rate (e.g., 60 Hz). In another example, when the state of the screen displayed on the display panel 330 is fixed, the processor 310 may set the frame rate to a second frame rate, which is lower than the first frame rate. In still another example, the processor 310 may change the frame rate from the first frame rate to the second frame rate while providing a video. In yet another example, the processor 310 may change the frame rate from the second frame rate to the first frame rate when a page is changed on the displayed screen, when the screen is scrolled, or when a quick screen switch is required, for example, when a pen input mode is provided.

In various embodiments, the processor 310 may monitor whether the state of the screen displayed on the display panel 330 is changed in order to identify whether the frame rate is changed.

In some embodiments, when detecting that the state of the screen displayed on the display panel 330 is fixed for a designated time or specified time, the processor 310 may transmit the control signal to change the frame rate from the first frame rate to the second frame rate to the display driving integrated circuit 320. For example, when detecting that content displayed on the display panel 330 is a still image which does not require screen update or when detecting that a user input to refine content displayed on the display panel 330 is not received for the specified time, the processor 310 may transmit the control signal to change the frame rate from the first frame rate to the second frame rate to the display driving integrated circuit 320. The display driving integrated circuit 320 may change the frame rate to the second frame rate upon receiving the control signal.

In some other embodiments, when detecting that the state of the screen displayed on the display panel 330 continuously changes, the processor 310 may transmit the control signal to change the frame rate from the second frame rate to the first frame rate to the display driving integrated circuit 320. For example, when detecting that content displayed on the display panel 330 is a video which requires screen update or when detecting that a user input to refine content displayed on the display panel 330 is received, the processor 310 may transmit the control signal to change the frame rate from the second frame rate to the first frame rate to the display driving integrated circuit 320. The display driving integrated circuit 320 may change the frame rate to the first frame rate upon receiving the control signal.

In various embodiments, the processor 310 may transmit information about content to be output or displayed on the display panel 330 to the display driving integrated circuit 320. For example, the processor 310 may write the information about the content in a graphic random-access memory (GRAM) included in the display driving integrated circuit 320. The display driving integrated circuit 320 may display the content on the display panel 330, based on the written information.

In various embodiments, the processor 310 may process an operation related to an input through interworking with the touch sensor controller 340. For example, the processor 310 may obtain information about a touch input to the content displayed on the display panel 330 from the touch sensor controller 340. For example, the information about the touch input may include one or more of data indicating an attribute of the touch input or data indicating a position where the touch input occurs (e.g., coordinate information about the touch input). The processor 310 may control at least one component (e.g., the display driving integrated circuit 320, the display panel 330, the touch sensor controller 340, the touch panel 350, an audio module (not shown in FIG. 3), a sensor module (not shown in FIG. 3), or the like) included in the electronic device 300 in order to perform an operation related to the touch input, based on the obtained information about the touch input.

In various embodiments, the display diving integrated circuit 320 may be operably coupled to or connected to the display panel 330.

In various embodiments, the display driving integrated circuit 320 may receive information about content from the processors 310. The display driving integrated circuit 320 may display the content on the display panel 330.

In various embodiments, the display driving integrated circuit 320 may receive a control signal from the processor 310. For example, the display driving integrated circuit 320 may receive a control signal to change the frame rate from the processor 310. The display driving integrated circuit 320 may change the frame rate, based on the control signal. For example, the display driving integrated circuit 320 may change the frame rate from the first frame rate to the second frame rate, which is lower than the first frame rate, based on the control signal. The second frame rate may be configured in the electronic device 300 in order to reduce power consumed to display a screen on the display panel 330. The second frame rate may be configured for context or a state where a screen displayed on the display panel 330 does not require a change or refinement. In another example, the display driving integrated circuit 320 may change the frame rate from the second frame rate to the first frame rate, which is higher than the second frame rate, based on the control signal. The first frame rate may be configured for context or a state where a screen displayed on the display panel 330 requires a change or refinement.

A change from the first frame rate to the second frame rate or a change from the second frame rate to the first frame rate may be configured based on a change of one or more of a vertical back porch period (or section) or a vertical front porch period (or section) of a vertical synchronization signal generated in the display driving integrated circuit 320. The vertical synchronization signal may be a signal indicating the start of one frame. The vertical back porch period and the vertical front porch period may be configured to indicate a time in which a screen is not displayed within the one frame. In some embodiments, the display driving integrated circuit 320 may extend the vertical back porch period of the vertical synchronization signal, based on reception of the control signal, thereby changing the first frame rate to the second frame rate. In some other embodiments, the display driving integrated circuit 320 may extend the vertical front porch period of the vertical synchronization signal, based on reception of the control signal, thereby changing the first frame rate to the second frame rate. In some other embodiments, the display driving integrated circuit 320 may extend the vertical back porch period and the vertical front porch period of the vertical synchronization signal, based on reception of the control signal, thereby changing the first frame rate to the second frame rate. In some other embodiments, the display driving integrated circuit 320 may generate and use a dummy horizontal synchronization signal, thereby changing the first frame rate to the second frame rate.

Figure 4:
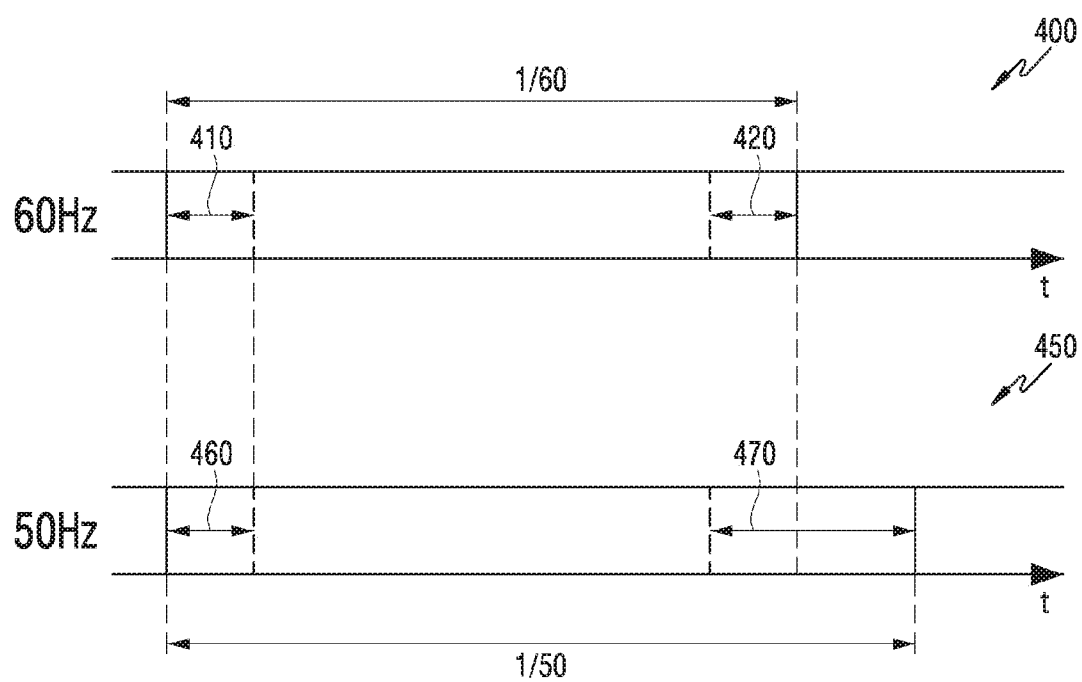
FIG. 4 illustrates an example of vertical synchronization signals used in an electronic device according to various embodiments.

For example, referring to FIG. 4, a graph 400 illustrates a vertical synchronization signal generated by the display driving integrated circuit 320 when the display panel 330 is controlled based on the first frame rate. The horizontal axis of the graph 400 may denote time, and the vertical axis of the graph 400 may denote a change in the state of the vertical synchronization signal. In the graph 400, when the first frame rate is 60 frames per second (fps) or 60 Hz, the duration of the vertical synchronization signal may be $\frac{1}{60}$ seconds. The vertical synchronization signal indicated by the graph 400 may include a vertical back porch period 410 and a vertical front porch period 420. The display driving integrated circuit 320 may change the vertical synchronization signal indicated by the graph 400 to a vertical synchronization signal indicated by a graph 450, based on reception of the control signal from the processor 310, thereby changing the first frame rate to the second frame rate. The horizontal axis of the graph 450 may denote time, and the vertical axis of the graph 450 may denote a change in the state of the vertical synchronization signal. In the graph 450, when the second frame rate is 50 fps or 50 Hz, the duration of the vertical synchronization signal indicated by the graph 450 may be $\frac{1}{50}$ seconds. The vertical synchronization signal indicated by the graph 450 may include a vertical back porch period 460 and a vertical front porch period 470. The display driving integrated circuit 320 may extend the vertical front porch period 420 of the vertical synchronization signal indicated by the graph 400 as the vertical front porch period 470 of the vertical synchronization signal indicated by the graph 450. The display driving integrated circuit 320 may change the first frame rate to the second frame rate by extending the vertical front porch period.

FIG. 4 illustrates an example of changing a frame rate by extending a vertical front porch period, but a method for changing the frame rate is not limited thereto. As described above, the frame rate may be changed by extending the vertical back porch period or by extending the front porch period and the vertical back porch period.

In various embodiments, the display driving integrated circuit 320 may transmit a synchronization signal to the touch sensor controller 340. For example, the display driving integrated circuit 320 may transmit the synchronization signal to prevent light emitted through the display panel 330 from acting as noise to the touch sensor controller 340 or to prevent the light from interfering with the touch sensor controller 340. In one example, the display driving integrated circuit 320 may transmit the synchronization signal to the touch sensor controller 340 in order to synchronize the operation of the touch sensor controller 340 with the operation of the display driving integrated circuit 320. In another example, the display driving integrated circuit 320 may transmit the synchronization signal to the touch sensor controller 340 in order to divide a time when the touch sensor controller 340 senses a touch input from a time period in which the light is emitted at a reference level or higher. The synchronization signal may include a vertical synchronization signal for the touch sensor controller 340. The synchronization signal may also be referred to as a touch panel synchronization signal or a touch screen panel synchronization signal.

In various embodiments, the display driving integrated circuit 320 may perform multiple transmissions of the synchronization signal to the touch sensor controller 340 within one frame. For example, the display driving integrated circuit 320 may perform multiple transmissions of the synchronization signal to the touch sensor controller 340 so that the touch sensor controller 340 operates based on an operating frequency thereof (e.g., 120 Hz). The operating frequency of the touch sensor controller 340 may be a multiple of the first frame rate. The operating frequency of the touch sensor controller 340 may not be a multiple of the second frame rate.

In various embodiments, the display driving integrated circuit 320 may determine a transmission mode for the synchronization signal, based on the frame rate. For example, the transmission mode may include a first transmission mode used when the display panel 330 is controlled based on the first frame rate and a second transmission mode used when the display panel 330 is controlled based on the second frame rate.

In various embodiments, the display driving integrated circuit 320 may configure a time interval between multiple transmissions of the synchronization signal according to the transmission mode. For example, when it is determined to perform multiple transmissions of the synchronization signal, based on the first transmission mode, the display driving integrated circuit 320 may uniformly configure time intervals between the multiple transmissions. That is, the time intervals between the multiple transmissions based on the first transmission mode may be the same. In another example, when it is determined to perform multiple transmissions of the synchronization signal, based on the second transmission mode, the display driving integrated circuit 320 may configure at least one time interval of the time intervals between the multiple transmissions to be different from the remaining time intervals excluding the at least one time interval among the time intervals. That is, a first time interval between a first transmission and a second transmission subsequent to the first transmission among the multiple transmissions based on the second transmission mode may be different from the remaining time intervals excluding the first time interval among the time intervals between the multiple transmissions based on the second transmission mode. In some embodiments, the remaining time intervals may be the same.

In various embodiments, the display driving integrated circuit 320 may control the time intervals between the multiple transmissions of the synchronization signal according to a change in the frame rate, thereby synchronizing the operation of the display driving integrated circuit 320 and the operation of the touch sensor controller 340 without changing the operating frequency of the touch sensor controller 340. In various embodiments, the display driving integrated circuit 320 may control the time intervals between the multiple transmissions of the synchronization signal according to a change in the frame rate, thereby solving a problem that periodicity of driving firmware (F/W) of a microcontroller unit (MCU) in the touch sensor controller 340 cannot be variably changed when the frame rate is changed. In various embodiments, the display driving integrated circuit 320 may control the time intervals between the multiple transmissions of the synchronization signal according to a change in the frame rate, thereby using an operating frequency (e.g., 120 Hz) suitable for the operation of the touch sensor controller 340 regardless of the change in the frame rate. In various embodiments, the display driving integrated circuit 320 may control the time intervals between the multiple transmissions of the synchronization signal according to a change in the frame rate, thereby optimizing synchronization between the processor 310 and the touch sensor controller 340.

In various embodiments, the touch sensor controller 340 may be operably coupled or connected to the touch panel 350. In various embodiments, the touch panel 350 is separated from the display panel 330 and may be disposed on the display panel 330. In various embodiments, the touch panel 350 may be configured as a touch sensor. The touch sensor may be integrally configured with the display through a touch electrode layer disposed on or inside the display panel 330.

In various embodiments, the touch sensor controller 340 may include a touch analog front end (AFE, not shown), an analog-to-digital converter (ADC, not shown), and a digital signal processor (DSP, not shown), or the microcontroller unit (MCU, not shown).

In various embodiments, the touch panel 350 may include a plurality of x-axis line sensors (i.e., a plurality of short line sensors, not shown) and a plurality of y-axis line sensors (i.e., a plurality of long line sensors, not shown).

The touch AFE may include a plurality of x-axis transmitters for simultaneously charging the plurality of x-axis line sensors and a plurality of y-axis transmitters for simultaneously charging the plurality of y-axis line sensors.

The touch AFE may include a plurality of receivers for sensing at least one (or one pair) of the plurality of x-axis line sensors or at least one (or one pair) of the plurality of y-axis line sensors. The plurality of receivers may simultaneously sense the at least one line sensor (or one pair of line sensors). The charging by the touch AFE and the sensing by the touch AFE may be performed simultaneously.

The touch AFE may process a touch input received through the touch panel 350. For example, the touch panel 350 may provide information about a variance in capacitance caused by the touch input to the touch AFE. The touch AFE may generate an analog signal, based on the information about the variance in capacitance. The touch AFE may provide the analog signal to the ADC.

In various embodiments, the operation of the touch AFE may be performed within the operating cycle (the inverse number of the operating frequency) of the touch sensor controller 340.

The ADC may receive the analog signal from the touch AFE. The ADC may obtain a digital signal converted from the analog signal. The ADC may provide the digital signal to the DSP.

The DSP may receive the digital signal from the ADC. The DSP may process the digital signal, thereby obtaining coordinate information about the touch input. The DSP may be configured as an ARM™.

According to embodiments, the operation of the DSP may be performed within the operating cycle of the touch sensor controller 340 or may be performed outside of the operating cycle of the touch sensor controller 340. At least part of the operation of the DSP may be performed in parallel with at least part of the operation of the touch AFE.

In various embodiments, the touch sensor controller 340 may operate based on the synchronization signal received multiple times from the display driving integrated circuit 320. For example, the touch AFE of the touch sensor controller 340 may start operating upon receiving the synchronization signal. In another example, the touch AFE of the touch sensor controller 340 may start operating after a lapse of a specified time from when the synchronization signal is received. The specified time may be set to sense the touch input at a time or in a time period when the intensity of light emitted through the display panel 330 is less than a reference intensity. That is, the time to sense the touch input may be separate from a time period in which the light is emitted at a reference level or higher.

Figure 5:
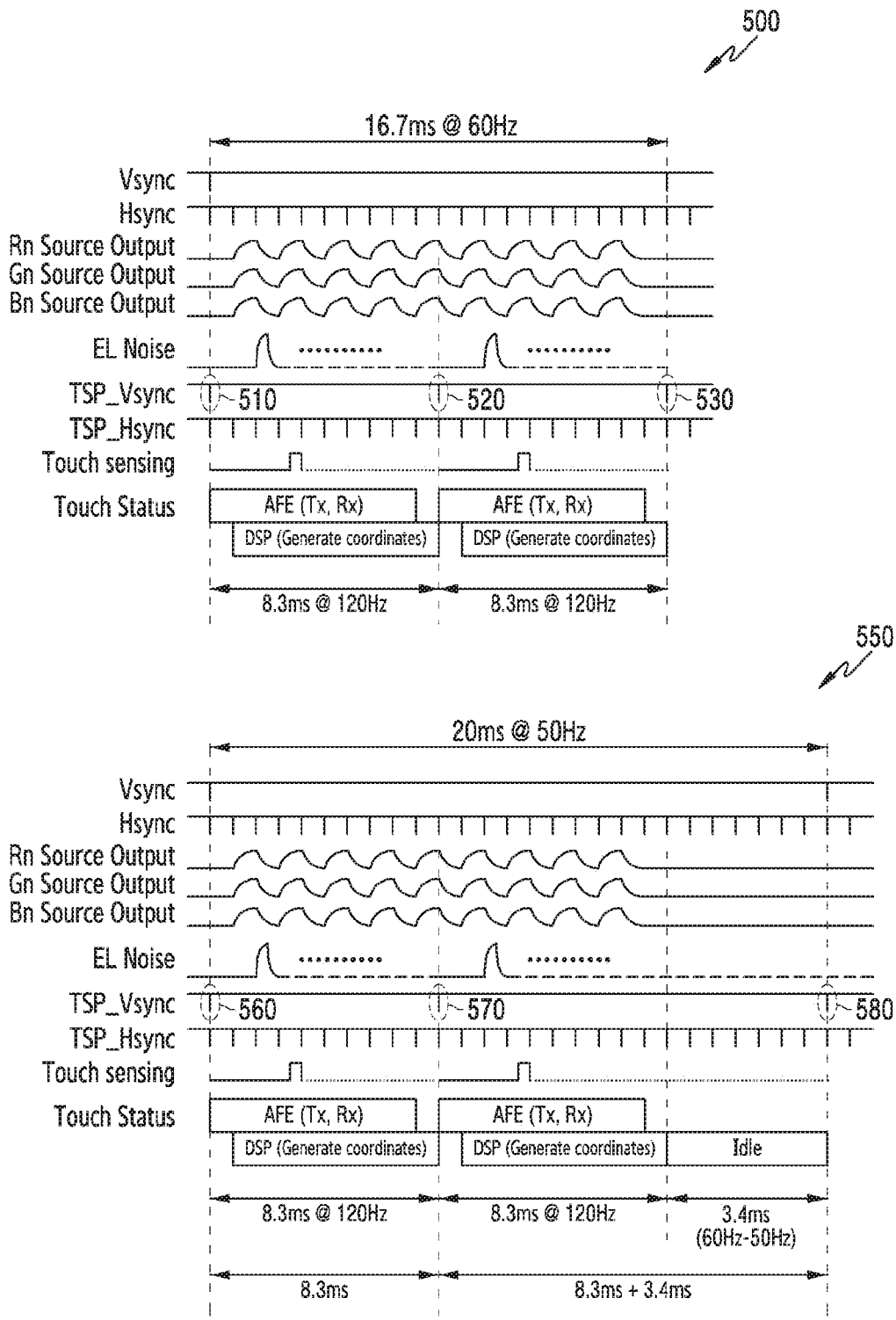
FIG. 5 is a timing chart illustrating the relationship between signals according to various embodiments.

For example, referring to FIG. 5, a timing chart 500 illustrates a time relationship between the operation of the display driving integrated circuit 320 and the operation of the touch sensor controller 340 when the display panel 330 is controlled based on the first frame rate. The horizontal axis of each of a plurality of graphs in the timing chart 500 may denote time.

In the timing chart 500, the display driving integrated circuit 320 may transmit a vertical synchronization signal (Vsync in the timing chart 500) and a horizontal synchronization signal (Hsync in the timing chart 500) in order to display content on the display panel 330. The period of the vertical synchronization signal may be 16.7 (=1/60) ms when the first frame rate is 60 Hz.

The display driving integrated circuit 320 may output light for displaying the content through at least one of a plurality of luminous elements included in the display panel 330, based at least on the vertical synchronization signal or the horizontal synchronization signal. For example, the display driving integrated circuit 320 may output light for displaying the content through an nth R-luminous element (e.g., Rn source output in the timing chart 500), may output light for displaying the content through an nth G-luminous element (e.g., Gn source output in the timing chart 500), and may output light for displaying the content through an nth B-luminous element (e.g., Bn source output in the timing chart 500), based at least on the vertical synchronization signal or the horizontal synchronization signal.

The display driving integrated circuit 320 may provide the content through the display panel 330 by output of light from at least one of the plurality of luminous elements. The output of light from at least one of the plurality of luminous elements may act as display noise (e.g., EL noise in the timing chart 500) in the operation of the touch sensor controller 340.

The display driving integrated circuit 320 may transmit a vertical synchronization signal (TSP_Vsync in the timing chart 500) and a horizontal synchronization signal (TSP_Hsync in the timing chart 500) for synchronizing the operation of the display driving integrated circuit 320 and the operation of the touch sensor controller 340 to the touch sensor controller 340. The display driving integrated circuit 320 may transmit the vertical synchronization signal and the horizontal synchronization signal to prevent the display noise from occurring. The vertical synchronization signal for synchronizing the operation of the display driving integrated circuit 320 and the operation of the touch sensor controller 340 may be transmitted multiple times within one frame. Each of time intervals between multiple transmissions of the vertical synchronization signal may correspond to the operating cycle of the touch sensor controller 340 (e.g., 8.3 (=1/120) ms in the timing chart 500). For example, the display driving integrated circuit 320 may transmit the vertical synchronization signal (TSP_Vsync) at a timing 510 when the one frame start, at a timing 520 after a lapse of the operating cycle of the touch panel 350 from the transmission at the timing 510, and at a timing 530 when the one frame ends. The time interval between the timing 510 and the timing 520 may be the same as the time interval between the timing 520 and the timing 530.

The touch sensor controller 340 may drive the touch AFE upon receiving the vertical synchronization signal transmitted from the display driving integrated circuit 320 to the touch sensor controller 340 at the timing 510. Upon receiving the vertical synchronization signal at the timing 510, the touch sensor controller 340 may charge the plurality of sensors in the touch panel 350 using the plurality of transmitters of the touch AFE and may sense the plurality of sensors using the plurality of receivers of the touch AFE. The touch sensor controller 340 may detect a touch input received through the touch panel 350 (touch sensing in the timing chart 500), based on the charging and the sensing. That is, the touch sensor controller 340 may convert a variance in capacitance due to the touch input into an analog signal using the touch AFE. A time when the operation of the touch AFE is completed may be within the operating cycle of the touch sensor controller 340. The touch AFE may require waiting for a certain period of time for a next operation. After converting the analog signal into a digital signal, the touch sensor controller 340 may obtain coordinate information about the digital signal using the DSP.

The touch sensor controller 340 may drive the touch AFE upon receiving the vertical synchronization signal transmitted from the display driving integrated circuit 320 to the touch sensor controller 340 at the timing 520. Upon receiving the vertical synchronization signal at the timing 520, the touch sensor controller 340 may charge the plurality of sensors in the touch panel 350 using the plurality of transmitters of the touch AFE and may sense the plurality of sensors using the plurality of receivers of the touch AFE. The touch sensor controller 340 may detect a touch input received through the touch panel 350 (touch sensing in the timing chart 500), based on the charging and the sensing. That is, the touch sensor controller 340 may convert a variance in capacitance due to the touch input into an analog signal using the touch AFE. A time when the operation of the touch AFE is completed may be within the operating cycle of the touch sensor controller 340. After converting the analog signal into a digital signal, the touch sensor controller 340 may obtain coordinate information about the digital signal using the DSP.

The touch sensor controller 340 may receive the vertical synchronization signal at the timing 530.

The operation illustrated in the timing chart 500 may be repeatedly performed every frame.

A timing chart 550 illustrates a time relationship between the operation of the display driving integrated circuit 320 and the operation of the touch sensor controller 340 when the display panel 330 is controlled based on the second frame rate. The horizontal axis of each of a plurality of graphs in the timing chart 550 may denote time.

In the timing chart 550, the display driving integrated circuit 320 may transmit a vertical synchronization signal (Vsync in the timing chart 550) and a horizontal synchronization signal (Hsync in the timing chart 550) in order to display content on the display panel 330. The period of the vertical synchronization signal may be 20 (=1/50) ms when the second frame rate is 50 Hz.

The display driving integrated circuit 320 may output light for displaying the content through at least one of a plurality of luminous elements included in the display panel 330, based at least on the vertical synchronization signal or the horizontal synchronization signal. For example, the display driving integrated circuit 320 may output light for displaying the content through an nth R-luminous element (e.g., Rn source output in the timing chart 550), may output light for displaying the content through an nth G-luminous element (e.g., Gn source output in the timing chart 550), and may output light for displaying the content through an nth B-luminous element (e.g., Bn source output in the timing chart 550), based at least on the vertical synchronization signal or the horizontal synchronization signal.

The display driving integrated circuit 320 may provide the content through the display panel 330 by output of light from at least one of the plurality of luminous elements. The output of light from at least one of the plurality of luminous elements may act as display noise (e.g., EL noise in the timing chart 550) in the operation of the touch sensor controller 340.

The display driving integrated circuit 320 may transmit a vertical synchronization signal (TSP_Vsync in the timing chart 550) and a horizontal synchronization signal (TSP_Hsync in the timing chart 500) for synchronizing the operation of the display driving integrated circuit 320 and the operation of the touch sensor controller 340 to the touch sensor controller 340. The display driving integrated circuit 320 may transmit the vertical synchronization signal and the horizontal synchronization signal to prevent the display noise from occurring. The vertical synchronization signal for synchronizing the operation of the display driving integrated circuit 320 and the operation of the touch sensor controller 340 may be transmitted multiple times within one frame. At least one of time intervals between multiple transmissions of the vertical synchronization signal may be different from the operating cycle of the touch sensor controller 340 (e.g., 8.3 (=1/120) ms in the timing chart 550). The remaining time intervals excluding the at least one time interval among the time intervals between the multiple transmissions of the vertical synchronization signal may correspond to the operating cycle of the touch sensor controller 340. For example, the display driving integrated circuit 320 may transmit the vertical synchronization signal (TSP_Vsync) at a timing 560 when the one frame start, at a timing 570 after a lapse of the operating cycle of the touch panel 350 from the transmission at the timing 560, and at a timing 580 when the one frame ends. Compared to the first frame rate (e.g., 60 Hz), the second frame rate (e.g., 50 Hz) is not a divisor of the operating cycle of the touch sensor controller 340, and thus the time interval between the timing 560 and the timing 570 may be different from the time interval between the timing 570 and the timing 580. For example, the time interval between the timing 560 and the timing 570 is 8.3 ms, while the time interval between the timing 570 and the timing 580 is 11.7 (=1/50-1/120) ms. Upon receiving the vertical synchronization signal at the timing 570, the touch sensor controller 340 may operate for 8.3 ms in order to maintain the operating frequency (or operation cycle) of the touch sensor controller 340, and may then stay in an idle state. While controlling the display panel 330, based on the second frame rate, the touch sensor controller 340 may synchronize the operation of the display driving integrated circuit 320 and the operation of the touch sensor controller 340 through a configuration of the idle state.

The touch sensor controller 340 may drive the touch AFE upon receiving the vertical synchronization signal transmitted from the display driving integrated circuit 320 to the touch sensor controller 340 at the timing 560. Upon receiving the vertical synchronization signal at the timing 560, the touch sensor controller 340 may charge the plurality of sensors in the touch panel 350 using the plurality of transmitters of the touch AFE and may sense the plurality of sensors using the plurality of receivers of the touch AFE. The touch sensor controller 340 may detect a touch input received through the touch panel 350 (touch sensing in the timing chart 550), based on the charging and the sensing. For example, the touch sensor controller 340 may convert a variance in capacitance due to the touch input into an analog signal using the touch AFE. A time when the operation of the touch AFE is completed may be within the operating cycle of the touch sensor controller 340. The touch AFE may require waiting for a certain period of time for a next operation. After converting the analog signal into a digital signal, the touch sensor controller 340 may obtain coordinate information about the digital signal using the DSP.

The touch sensor controller 340 may drive the touch AFE upon receiving the vertical synchronization signal transmitted from the display driving integrated circuit 320 to the touch sensor controller 340 at the timing 570. Upon receiving the vertical synchronization signal at the timing 570, the touch sensor controller 340 may charge the plurality of sensors in the touch panel 350 using the plurality of transmitters of the touch AFE and may sense the plurality of sensors using the plurality of receivers of the touch AFE. The touch sensor controller 340 may detect a touch input received through the touch panel 350 (touch sensing in the timing chart 550), based on the charging and the sensing. That is, the touch sensor controller 340 may convert a variance in capacitance due to the touch input into an analog signal using the touch AFE. A time when the operation of the touch AFE is completed may be within the operating cycle of the touch sensor controller 340. After converting the analog signal into a digital signal, the touch sensor controller 340 may obtain coordinate information about the digital signal using the DSP. Unlike the case where the frame rate is the first frame rate, the touch sensor controller 340 may wait until the timing 580 arrives.

The operation illustrated in the timing chart 550 may be repeatedly performed every frame.

As described above, the display driving integrated circuit 320 of the electronic device 300 according to various embodiments may provide a synchronization signal to the touch sensor controller 340, based on a transmission mode having different transmission intervals according to a frame rate, thereby preventing an asynchronization period from occurring in the operation of the touch sensor controller 340.

The timing chart 500 and the timing chart 550 illustrated in FIG. 5 illustrate the case where the first frame rate is 60 Hz and the second frame rate is 50 Hz, which are only for illustration. It should be noted that various embodiments may be employed in an environment in which frame rates different from 60 Hz and 50 Hz are applied.

In various embodiments, when the display panel 330 is controlled based on the second frame rate, the display driving integrated circuit 330 may configure an operation period of the touch sensor controller 340 as an extended vertical porch (e.g., vertical back porch or vertical front port) period of the vertical synchronization signal in order to prevent light, output from the luminous elements of the display panel 330, from interfering with the operation of the touch sensor controller 340. The display driving integrated circuit 330 may change the order of one time interval (e.g., the time interval between the timing 570 and the timing 580 in the timing chart 550 of FIG. 5) among the time intervals between the multiple transmissions based on the second transmission mode, thereby configuring the operation period of the touch sensor controller 340 as the extended vertical porch period of the vertical synchronization signal. The display driving integrated circuit 330 may adjust the transmission timing of an initial transmission among the multiple transmissions based on the second transmission mode, thereby configuring the operation period of the touch sensor controller 340 as the extended vertical porch period of the vertical synchronization signal.

Figure 6:
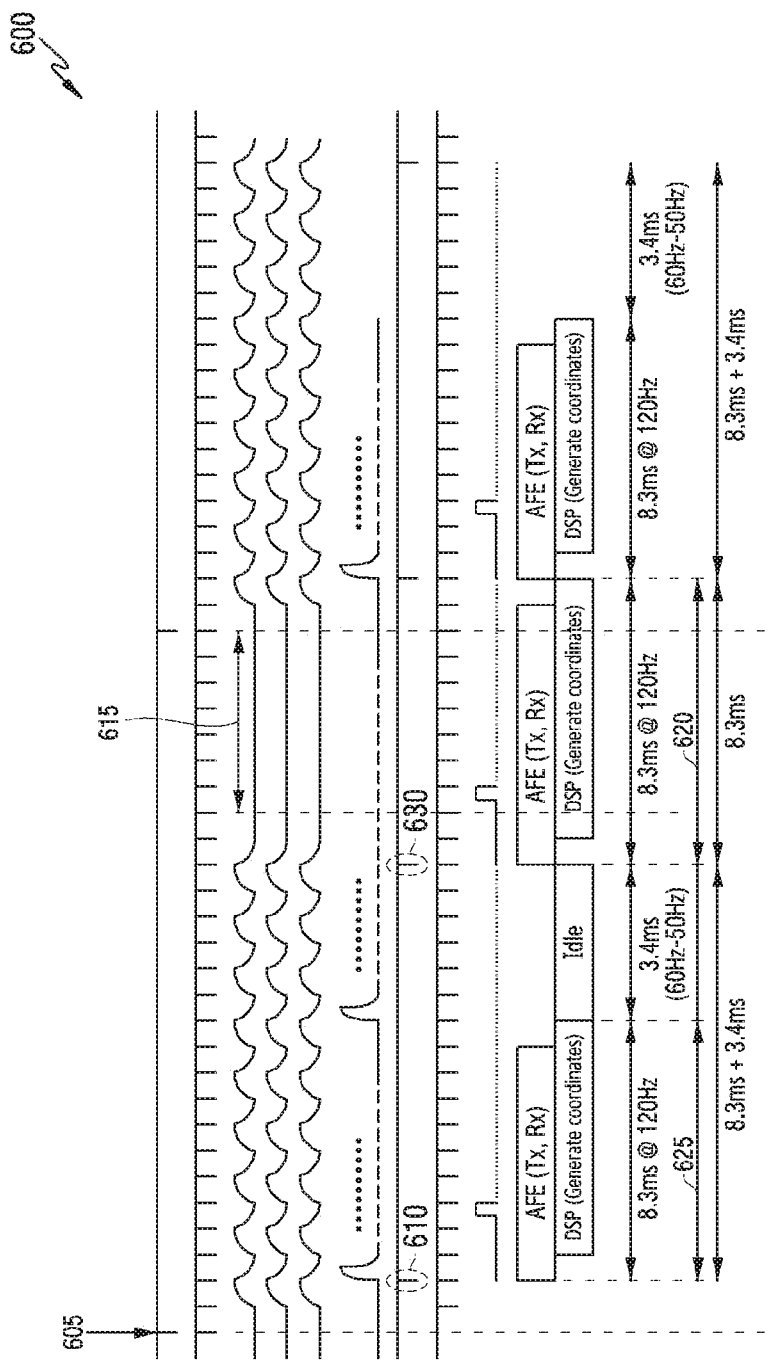
FIG. 6 is a timing chart illustrating the relationship between signals according to various embodiments.

For example, referring to FIG. 6, a timing chart 600 illustrates a time relationship between the operation of the display driving integrated circuit 320 and the operation of the touch sensor controller 340 when the display panel 330 is controlled based on the second frame rate. The horizontal axis of each of a plurality of graphs in the timing chart 600 may denote time.

In the timing chart 600, the display driving integrated circuit 320 may set a transmission timing 610 for a vertical synchronization signal (e.g., TSP_Vsync in the timing chart 600, hereinafter, "first vertical synchronization signal"), transmitted from the display driving integrated circuit 320 to the touch sensor controller 340, to be different from a transmission timing 605 for a vertical synchronization signal (e.g., Vsync in the timing chart 600, hereinafter "second vertical synchronization signal") used in the display driving integrated circuit 320. For example, the display driving integrated circuit 320 may delay the transmission timing of the first vertical synchronization signal (e.g., TSP_Vsync in the timing chart 600). The time interval between the transmission timing 605 and the transmission timing 610 may be set so that at least part of an operation period 620 of the touch sensor controller 340 is included in an extended vertical port period 615 of the second vertical synchronization signal (e.g., the period 615 and the period 620 at least partially overlap in time). The time interval between the transmission timing 605 and the transmission timing 610 may be set so that an operation period 625 of the touch sensor controller 340 is disposed to avoid a period in which the display noise (e.g., EL noise in the timing chart 600) occurs.

The display driving integrated circuit 320 may configure the order of a time interval including a period in which the touch sensor controller 340 is in the idle state among the time intervals between the multiple transmissions based on the second transmission mode to be different from that in the timing chart 550 of FIG. 5. For example, the display driving integrated circuit 320 may transmit the first vertical synchronization signal to the touch sensor controller 340 at a timing 630 after a lapse of 11.7 ms from the timing 610. The display driving integrated circuit 320 may transmit the first vertical synchronization signal at the timing 630 so that at least part of the operation period 620 of the touch sensor controller 340 is included in the extended vertical port period 615 of the second vertical synchronization signal. Since the operation of the touch sensor controller 340 in the operation period 620 is performed in at least part of the extended vertical porch period 615 of the second vertical synchronization signal in which the display panel 330 is temporarily disabled, the electronic device 300 may provide an improved touch recognition rate in the operation period 620.

The operation illustrated in the timing chart 600 may be repeatedly performed every frame.

As described above, the display driving integrated circuit 320 of the electronic device 300 according to various embodiments may adjust the transmission timing of a synchronization signal provided from the display driving integrated circuit 320 to the touch sensor controller 340, thereby providing an improved touch input recognition rate in an environment in which the frame rate is changed.

Figure 7:
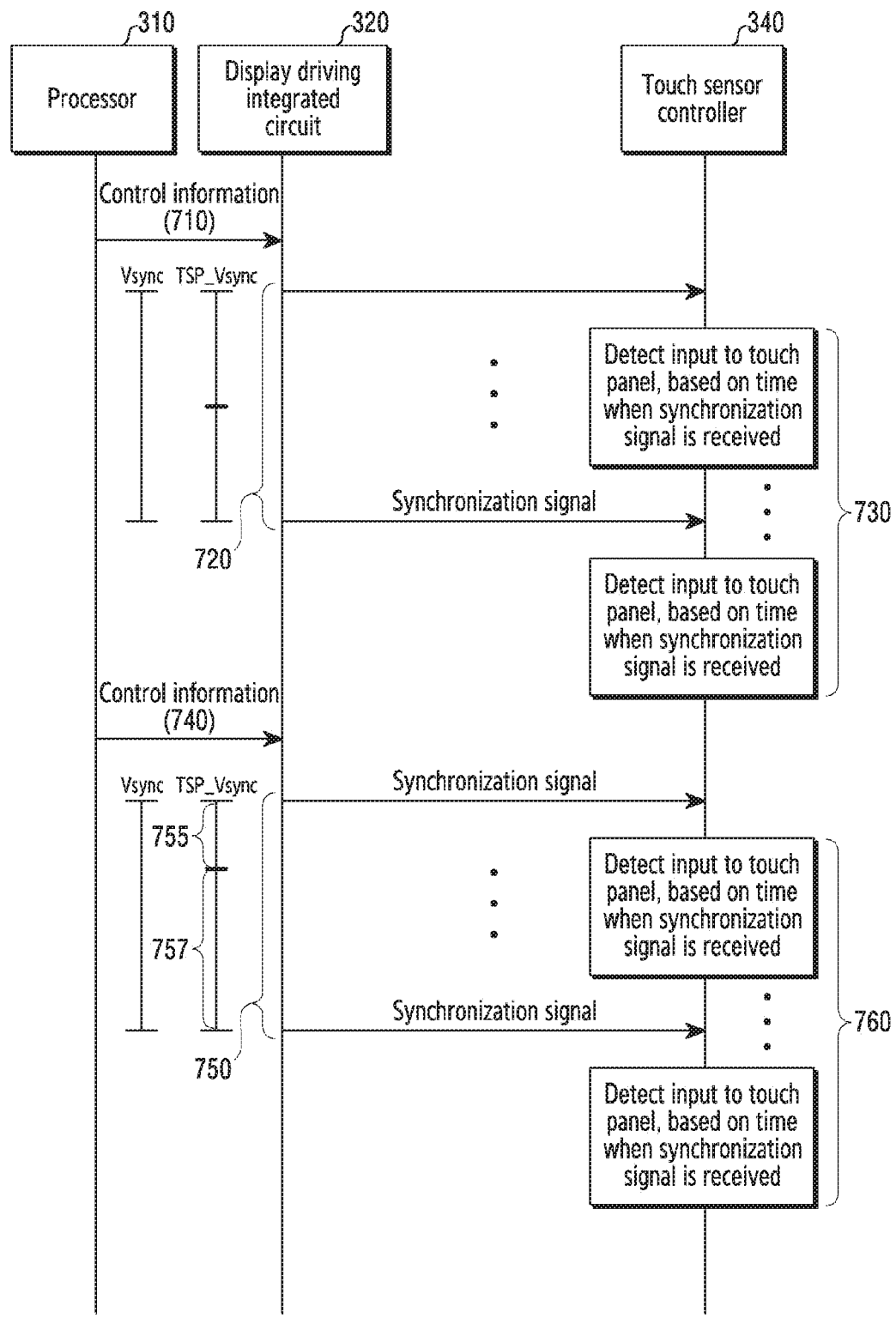
FIG. 7 illustrates an example of signaling between components of an electronic device according to various embodiments.

FIG. 7 illustrates an example of signaling between components of an electronic device according to various embodiments. Such signaling may occur within the electronic device 101 illustrated in FIG. 1 or the electronic device 300 illustrated in FIG. 3.

Referring to FIG. 7, in operation 710, the processor 310 may transmit control information to the display driving integrated circuit 320. The control information may indicate that the display panel 330 is controlled based on the first frame rate. The display driving integrated circuit 320 may receive the control information. The display driving integrated circuit 320 may control the display panel 330, based on the first frame rate, based on the control information. The display driving integrated circuit 320 may determine, based on the control information, to perform multiple transmissions of a synchronization signal to the touch sensor controller 340, based on the first transmission mode.

In operation 720, the display driving integrated circuit 320 may perform multiple transmissions of the synchronization signal to the touch sensor controller 340, based on the first transmission mode. Time intervals between the multiple transmissions of the synchronization signal based on the first transmission mode may be the same. For example, when the first frame rate is 60 Hz and the operating frequency of the touch sensor controller 340 is 120 Hz, the synchronization signal may be transmitted to the touch sensor controller 340 at a time interval of $\frac{1}{120}$ s. The touch sensor controller 340 may receive the synchronization signal transmitted multiple times. For example, referring to the timing chart 500 in FIG. 5, based on the first transmission mode, the display driving integrated circuit 320 may transmit the synchronization signal at the timing 510, may transmit the synchronization signal at the timing 520 after a lapse of the operating cycle of the touch panel 350 from the transmission at the timing 510, and may transmit the synchronization signal at the timing 530 (i.e., the timing when one frame ends) after a lapse of the operating cycle of the touch panel 350 from the transmission at the timing 520.

In operation 730, the touch sensor controller 340 may detect an input to the touch panel 350, based on the time when the synchronization signal is received. For example, the touch sensor controller 340 may obtain an analog signal with respect to the input using the touch AFE at the time when the synchronization signal is received, may provide a digital signal, converted from the analog signal, to the digital signal processor, and may obtain or generate coordinate information about the input using the digital signal processor.

In operation 740, the processor 310 may transmit control information to the display driving integrated circuit 320. The control information may indicate that the display panel 330 is controlled based on the second frame rate. The control information may indicate that the frame rate is changed to the second frame rate. The display driving integrated circuit 320 may identify, based on the control information, to perform multiple transmissions of a synchronization signal to the touch sensor controller 340, based on the second transmission mode.

In operation 750, the display driving integrated circuit 320 may perform multiple transmissions of the synchronization signal to the touch sensor controller 340, based on the second transmission mode. A first time interval 755 between a first transmission and a second transmission subsequent to the first transmission among the multiple transmissions of the synchronization signal based on the second transmission mode may be different from the remaining time intervals 757 excluding the first time interval 755 among time intervals between the multiple transmissions based on the second transmission mode. For example, when the second frame rate is 50 Hz and the operating frequency of the touch sensor controller 340 is 120 Hz, the first time interval 755 may set to 11.7 ms and the remaining time intervals 757 may be set to 8.3 ms. The arrangement order of the first time interval 755 and the remaining time intervals 757 may be changed according to embodiments. The touch sensor controller 340 may receive the synchronization signal transmitted multiple times. For example, referring to the timing chart 550 in FIG. 5, based on the second transmission mode, the display driving integrated circuit 320 may transmit the synchronization signal at the timing 560, may transmit the synchronization signal at the timing 570 after a lapse of the operating cycle of the touch panel 350 from the transmission at the timing 560, and may transmit the synchronization signal at the timing 580 when one frame ends. In another example, referring to the timing chart 600 in FIG. 6, based on the second transmission mode, the display driving integrated circuit 320 may transmit the synchronization signal at the timing 610 and may transmit the synchronization signal at the timing 630 after the transmission at the timing 610.

In operation 760, the touch sensor controller 340 may detect an input to the touch panel 350, based on the time when the synchronization signal is received. For example, the touch sensor controller 340 may obtain an analog signal related to the input using the touch AFE at the time when the synchronization signal is received, may provide a digital signal, converted from the analog signal, to the digital signal processor, and may obtain or generate coordinate information about the input using the digital signal processor. According to embodiments, at least part of the operation of detecting the input may be included in an extended vertical porch period according to a change to the second frame rate.

FIG. 7 illustrates an example in which operations 710 to 730 are performed before operations 740 to 760, which is for illustration. Unlike the example illustrated in FIG. 7, operations 740 to 760 may be performed before operations 710 to 730.

Further, operations 710 to 730 may be independent of operations 740 to 760. That is, operations 710 to 730 may be operations that are connected with operations 740 to 760 or may be operations that are not connected with operations 740 to 760.

An electronic device having a display panel (e.g., the electronic device 101 illustrated in FIG. 1 or the electronic device 300 illustrated in FIG. 3) may reduce power consumed due to display of a screen not only by changing a frame rate but also by changing a driving mode (e.g., a mode of a screen). For example, the driving mode may include a normal mode and an always-on-display (AOD) mode. While the electronic device is providing the normal mode, the main processor 121 illustrated in FIG. 1 or the processor 310 illustrated in FIG. 3 may operate in an active state. While the electronic device is providing the AOD mode, the main processor 121 illustrated in FIG. 1 or the processor 310 illustrated in FIG. 3 may be in an inactive state for at least part of a period in which the AOD mode is provided. The inactive state may include a turn-off state that requires booting to switch to the active state or an idle state or standby state that does not require booting to switch to the active state. When the driving mode is switched, a touch sensor controller of the electronic device may operate asynchronously with a display driving integrated circuit of the electronic device in at least part of an operation section of the touch sensor controller. This asynchronous operation may cause a touch dead time. Therefore, a method for solving this asynchronous operation may be required.

The electronic device according to various embodiments may control a synchronization signal provided from the display driving integrated circuit to the touch sensor controller, thereby preventing an asynchronous period from occurring according to a change in the driving mode.

Figure 8:
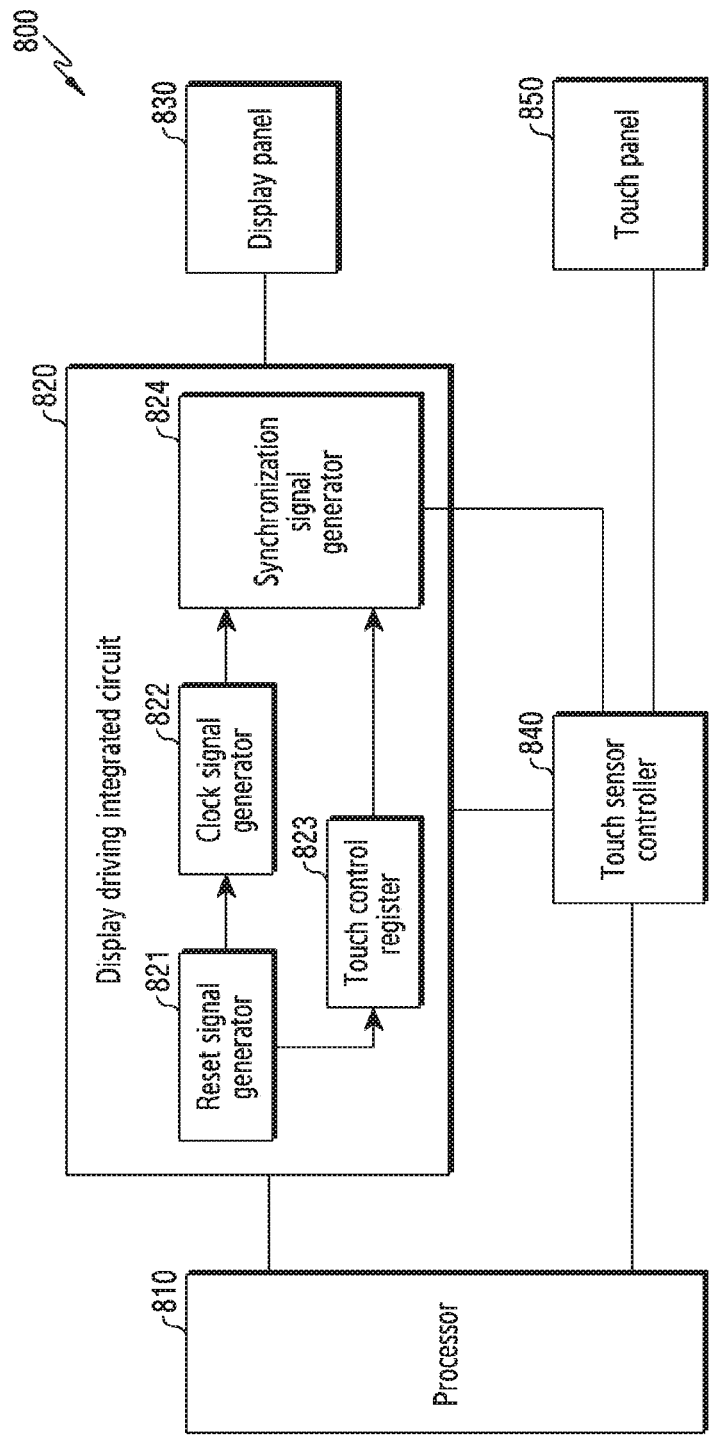
FIG. 8 illustrates another example of a functional configuration of an electronic device according to various embodiments.

FIG. 8 illustrates another example of a functional configuration of an electronic device according to various embodiments.

Referring to FIG. 8, the electronic device 800 may include a processor 810, a display driving integrated circuit 820, a display panel 830, a touch sensor controller 840, and a touch panel 850.

The processor 810 may include the processor 120 illustrated in FIG. 1 or the processor 310 illustrated in FIG. 3, the display driving integrated circuit 820 may include the display driver IC 230 illustrated in FIG. 2 or the display driving integrated circuit 320 illustrated in FIG. 3, the display panel 830 may include the display 210 illustrated in FIG. 2 or the display panel 330 illustrated in FIG. 3, the touch sensor controller 840 may include one or more among the touch sensor 251 illustrated in FIG. 2 or the touch sensor IC 253 illustrated in FIG. 2, or the touch sensor controller 340 illustrated in FIG. 3, and the touch panel 850 may include one or more of the touch sensor 251 illustrated in FIG. 2 or the touch sensor IC 253 illustrated in FIG. 2, or the touch panel 350 illustrated in FIG. 3.

In various embodiments, the processor 810 may detect an input to change a driving mode displayed on the display panel 830. For example, the input may be an input to change the AOD mode to the normal mode. In another example, the input may be an input to change the normal mode to the AOD mode.

In various embodiments, the processor 810 may transmit a control signal to initialize the display driving integrated circuit 820 to the display driving integrated circuit 820 upon detecting the input. Initialization of the display driving integrated circuit 820 may indicate rebooting the display driving integrated circuit 820.

The display driving integrated circuit 820 may include a plurality of components in order to prevent an asynchronous period from occurring according to the switch of the driving mode. For example, the display driving integrated circuit 820 may include a reset signal generator 821, a clock signal generator 822, a touch control register 823, and a synchronization signal generator 824.

The synchronization signal generator 824 may transmit at least one synchronization signal to the touch sensor controller 840 every specified period. The at least one synchronization signal may include the synchronization signal illustrated in the description of FIG. 3.

According to embodiments, the synchronization signal generator 824 may be included in a timing controller not shown in FIG. 8.

The processor 810 may detect the input while the display driving integrated circuit 820 transmits the at least one synchronization signal to the touch sensor controller 840 using the synchronization signal generator 824. The processor 810 may transmit the control signal to the display driving integrated circuit 820 upon detecting the input.

The display driving integrated circuit 820 may initialize the display driving integrated circuit 820, based on the control signal. When all the components in the display driving integrated circuit 820 are initialized, transmitting the synchronization signal from the display driving integrated circuit 820 to the touch sensor controller 840 every specified period may be ceased. To prevent the transmission of the synchronization signal from being ceased, the display driving integrated circuit 820 may include the reset signal generator 821, the clock signal generator 822, the touch control register 823, and the synchronization signal generator 824 that operate independently of the initialization.

In various embodiments, the reset signal generator 821 may receive the control signal from the processor 810. The reset signal generator 821 may generate or obtain a first reset signal to initialize at least one remaining component other than the reset signal generator 821, the clock signal generator 822, the touch control register 823, and the synchronization signal generator 824 among the components in the display driving integrated circuit 820, and a second reset signal to maintain the operation of the reset signal generator 821, the clock signal generator 822, the touch control register 823, and the synchronization signal generator 824, based on the control signal. The reset signal generator 821 may transmit the first reset signal to the at least one remaining component. The at least one remaining component may receive the first reset signal. The at least one remaining component may perform initialization upon receiving the first reset signal. The reset signal generator 821 may transmit the second reset signal to the clock signal generator 822, the touch control register 823, and the synchronization signal generator 824. Upon receiving the second reset signal, the clock signal generator 822, the touch control register 823, and the synchronization signal generator 824 may perform the respective operations of the clock signal generator 822, the touch control register 823, and the synchronization signal generator 824 independently of the initialization of the at least one remaining component.

In various embodiments, the clock signal generator 822 may receive the second reset signal. In various embodiments, the clock signal generator 822 may receive information about the period of a clock signal to be generated by the clock signal generator 822. The clock signal generator 822 may identify the duty cycle of the clock signal to be generated, based on the information about the period, and may generate the clock signal, based on the identified duty cycle. The clock signal generator 822 may provide the clock signal to the synchronization signal generator 824.

In various embodiments, the touch control register 823 may identify or extract a command, such as the control signal, or content, such as an image, from information received from the processor 810. The touch control register 823 may transmit a signal indicating maintenance of the operating mode of the synchronization signal generator 824 to the synchronization signal generator 824 or may transmit a signal indicating a change of the operating mode of the synchronization signal generator 824 to the synchronization signal generator 824, based at least partly on the identified or extracted control signal or the second reset signal. The touch control register 823 may be configured as a flip-flop.

In various embodiments, the synchronization signal generator 824 may generate the at least one synchronization signal using the clock signal, based at least on reception of the signal from the touch control register 823. For example, the synchronization signal generator 824 may identify the transmission timing of the at least one synchronization signal from the clock signal, and may transmit the at least one synchronization signal to the touch sensor controller 840, based on the identified timing. The synchronization signal generator 824 may transmit the at least one synchronization signal to the touch sensor controller 840 while the remaining components of the display driving integrated circuit are performing initialization. The synchronization signal generator 824 may transmit the at least one synchronization signal to the touch sensor controller 840 independently of the initialization of the display driving circuit.

One or more of the display driving integrated circuit 820, and the reset signal generator 821, the clock signal generator 822, the touch control register 823 or the synchronization signal generator 824 may be designed as one display driving integrated circuit chip.

According to embodiments, one or more of the reset signal generator 821, the clock signal generator 822, or the touch control register 823 may not be included in the display driving integrated circuit 820. That is, one or more of the reset signal generator 821, the clock signal generator 822, or the touch control register 823 may not be essential components for implementing various embodiments.

As described above, the electronic device 800 according to various embodiments may provide at least one synchronization signal to the touch sensor controller 840 using at least one component (e.g., the reset signal generator 821, the clock signal generator 822, the touch control register 823, or the synchronization signal generator 824) of the display driving integrated circuit 820, which operates independently of the initialization of the display driving integrated circuit 820, thereby preventing the touch sensor controller 840 from asynchronously operating according to a change in the driving mode.

Figure 9:
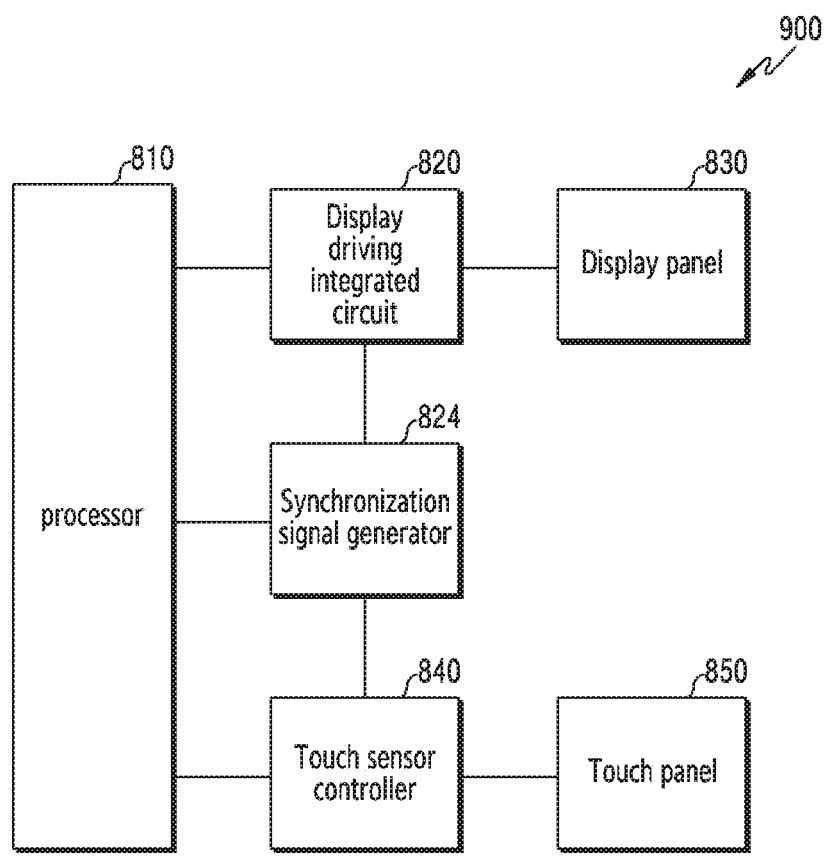
FIG. 9 illustrates still another example of a functional configuration of an electronic device according to various embodiments.

FIG. 9 illustrates still another example of a functional configuration of an electronic device according to various embodiments.

Referring to FIG. 9, the electronic device 900 may include a processor 810, a display driving integrated circuit 820, a synchronization signal generator 824, a display panel 830, a touch sensor controller 840, and a touch panel 850.

Unlike the electronic device 800 illustrated in FIG. 8, the electronic device 900 illustrated in FIG. 9 may include the synchronization signal generator 824, which transmits at least one synchronization signal to control the touch sensor controller 840 independently of initialization of the display driving integrated circuit 820 according to a change in driving mode, outside the display driving integrated circuit 820.

In various embodiments, the synchronization signal generator 824 may provide the at least one synchronization signal to the touch sensor controller 840, based on a control signal obtained from the processor 810. For example, the control signal may be a clock signal for generating the at least one synchronization signal.

In various embodiments, the synchronization signal generator 824 may provide a synchronization signal, such as a vertical synchronization signal or a horizontal synchronization signal, to the display driving integrated circuit 820 or may provide a clock signal for the operation of the display driving integrated circuit 820, based on the control signal.

In various embodiments, the synchronization signal generator 824 may generate and transmit various types of synchronization signals independently (or regardless) of the operation of the display driving integrated circuit 820 and the operation of the touch sensor controller 840. The electronic device 900 according to various embodiments may prevent a touch dead time from occurring according to a change in the driving mode by generating and transmitting the synchronization signal.

Figure 10:
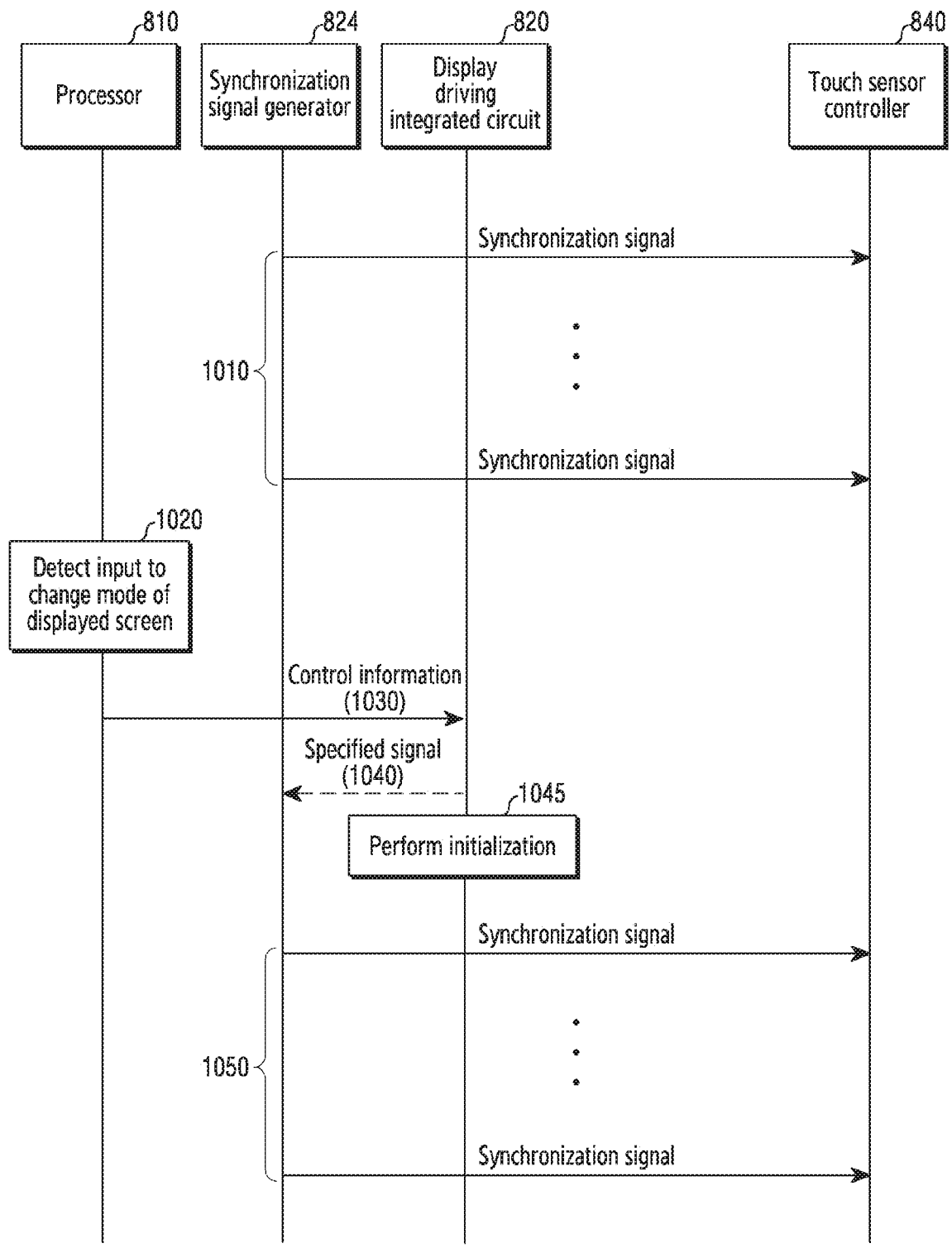
FIG. 10 illustrates another example of signaling between components of an electronic device according to various embodiments.

FIG. 10 illustrates another example of signaling between components of an electronic device according to various embodiments. Such signaling may occur within the electronic device 101 illustrated in FIG. 1, the electronic device 300 illustrated in FIG. 3, the electronic device 800 illustrated in FIG. 8, or the electronic device 900 illustrated in FIG. 9.

Referring to FIG. 10, in operation 1010, the synchronization signal generator 824 may transmit a synchronization signal to the touch sensor controller 840 every specified period. The synchronization signal generator 824 may be associated with the display driving integrated circuit 820. In some embodiments, for association with the display driving integrated circuit 820, the synchronization signal generator 824 may be included in the display driving integrated circuit 820 as in the electronic device 800 illustrated in FIG. 8. In some other embodiments, for association with the display driving integrated circuit 820, the synchronization signal generator 824 may be disposed outside the display driving integrated circuit 820 and may be functionally coupled with the display driving integrated circuit 820 as in the electronic device 900 illustrated in FIG. 9. The specified period may be determined based on a frame rate to control the display panel 830 functionally connected to the display driving integrated circuit 820. The specified period may be the same for each transmission of the synchronization signal or may be partly changed. The touch sensor controller 840 may receive the synchronization signal every specified period. The touch sensor controller 840 may be driven based at least on a time when the synchronization signal is received, thus detecting an input to the touch panel 850 functionally coupled with the touch sensor controller 840.

In operation 1020, the processor 810 may detect an input to change a driving mode displayed on the display panel 830. For example, the processor 810 may detect an input or event to change the driving mode from the normal mode to the AOD mode. For example, the input may be depressing a physical button of the electronic device in a standby screen state. For example, the event may be a lapse of a specified time without a specific input in the standby screen state.

In operation 1030, the processor 810 may transmit control information to the display driving integrated circuit 820, based on the detection. The control information may be used to indicate the type of the drive mode. The control information may be used to indicate that the driving mode is changed from the normal mode (or the AOD mode) to the AOD mode (or the normal mode). The display driving integrated circuit 820 may receive the control information.

In operation 1040, the display driving integrated circuit 820 may transmit a specified signal to the synchronization signal generator 824. The specified signal may be used to indicate that the display driving integrated circuit 820 performs initialization. The specified signal may be transmitted from the display driving integrated circuit 820 to the synchronization signal generator 824 so that the synchronization signal generator 824 maintains transmission of the synchronization signal independently of the initialization of the display driving integrated circuit 820. For example, as illustrated in FIG. 8, the display driving integrated circuit 820 may provide the specified signal to the synchronization signal generator 824 using one or more of the reset signal generator 821, the clock signal generator 822, or the touch control register 823. The synchronization signal generator 824 may obtain the specified signal.

FIG. 10 illustrates an example in which the synchronization signal generator 824 is disposed in the display driving integrated circuit 820. As illustrated in FIG. 9, when the synchronization signal generator 824 is disposed outside the display driving integrated circuit 820, operation 1040 may be omitted or bypassed.

In operation 1045, the display driving integrated circuit 820 may perform initialization, based on the control information. For example, the display driving integrated circuit 820 may maintain driving of at least one first component associated with the synchronization signal generator 824 and may initialize at least one second component other than the at least one first component among components in the display driving integrated circuit 820, thereby performing the initialization of the display driving integrated circuit 820.

Although FIG. 10 illustrates an example in which operation 1045 is performed after operation 1040, operation 1045 may be performed in parallel with operation 1040.

In operation 1050, the synchronization signal generator 824 may maintain the transmission of the synchronization signal independently of the initialization of the display driving integrated circuit 820, based on reception of the specified signal. By maintaining the transmission of the synchronization signal, the electronic device according to various embodiments may prevent a touch dead time from occurring according to a change in the driving mode. That is, the electronic device according to various embodiments may enhance a touch input recognition rate by controlling a synchronization signal.

As described above, an electronic device according to various embodiments may include: a display driving integrated circuit (DDIC) configured to be operably coupled to a display panel; and a touch sensor controller configured to be operably coupled to the display driving integrated circuit and to be operably coupled to a touch sensor, wherein the display driving integrated circuit may be configured to: perform multiple transmissions of a synchronization signal for synchronizing an operation of the display driving integrated circuit with an operation of the touch sensor controller to the touch sensor controller within one frame, based on a first transmission mode when the display panel is controlled based on a first frame rate; and perform multiple transmissions of the synchronization signal to the touch sensor controller within the frame, based on a second transmission mode when the display panel is controlled based on a second frame rate, time intervals between the multiple transmissions based on the first transmission mode may be the same, and a first time interval between a first transmission and a second transmission subsequent to the first transmission among the multiple transmissions based on the second transmission mode may be different from remaining time intervals excluding the first time interval among time intervals between the multiple transmissions based on the second transmission mode.

According to various embodiments, a last transmission among the multiple transmissions based on the first transmission mode may be performed at an end timing of the frame, and a last transmission among the multiple transmissions based on the second transmission mode may be performed at the end timing of the frame.

According to various embodiments, the second frame rate may be lower than the first frame rate, and the display driving integrated circuit may be configured to extend a vertical porch (V-porch) of a vertical synchronization signal associated with the first frame rate and to control the display panel, based on the second frame rate associated with a vertical synchronization signal based on the extended vertical porch.

According to various embodiments, the touch sensor controller may be configured to detect an input to the touch panel, based on a timing when the synchronization signal is received. In some embodiments, the touch sensor controller may be configured to include an analog front end (AFE) and a digital signal processor, to obtain an analog signal with respect to the input using the analog front end at the timing when the synchronization signal is received, and to generate coordinate information about the input by providing a digital signal, converted from the analog signal, to the digital signal processor. For example, a timing when an operation of the analog front end obtaining the analog signal is completed may be within an operating cycle of the touch sensor controller. In another example, the touch sensor controller may be configured to include an analog front end (AFE) and a digital signal processor, to obtain an analog signal with respect to the input using the analog front end after a lapse of a specified time interval from when the synchronization signal is received, and to generate coordinate information about the input by providing a digital signal, converted from the analog signal, to the digital signal processor.

According to various embodiments, an operating frequency of the touch sensor controller may be a multiple of the first frame rate.

According to various embodiments, the second transmission may be the last transmission among the multiple transmissions based on the second transmission mode.

According to various embodiments, the second frame rate may be lower than the first frame rate, the display driving integrated circuit may be configured to extend a vertical porch (V-porch) of a vertical synchronization signal associated with the first frame rate and to control the display panel, based on the second frame rate associated with a vertical synchronization signal based on the extended vertical porch, and a second time interval among the remaining time intervals may be included in at least a portion of the period of the extended vertical porch.

According to various embodiments, the display driving integrated circuit may be disposed adjacently to one surface of the display panel.

According to various embodiments, the second frame rate may be set for a low power mode of the electronic device.

According to various embodiments, the first frame rate may correspond to 60 hertz (Hz), the second frame rate may correspond to 50 Hz, and the operating frequency of the touch sensor controller may correspond to 120 Hz.

As described above, an electronic device according to various embodiments may include: a touch sensor controller configured to be operably coupled to a touch panel; a display driving integrated circuit configured to be operably coupled to the touch sensor controller and a display panel; a synchronization signal generator configured to generate at least one synchronization signal associated with the touch sensor controller and to be associated with the display driving integrated circuit; and a processor configured to be operably coupled to the display driving integrated circuit, wherein the synchronization signal generator may be configured to transmit the at least one synchronization signal to the touch sensor controller every specified period, the processor may be configured to detect an input to change a driving mode of the display panel and to transmit a control signal to initialize the display driving integrated circuit to the display driving integrated circuit upon detecting the input, the display driving integrated circuit may be configured to initialize the display driving integrated circuit, based on the control signal, and the synchronization signal generator may be further configured to maintain transmission of the at least one synchronization signal to the touch sensor controller every specified period while initializing the display driving integrated circuit.

According to various embodiments, the processor may be configured to detect the input to change the driving mode of the display panel from an always-on-display (AOD) mode to a normal mode.

According to various embodiments, the synchronization signal generator may be included in the display driving integrated circuit, the display driving integrated circuit may further include a reset signal generator, the reset signal generator may be configured to generate a first reset signal to initialize at least one second component other than at least one first component associated with the synchronization signal generator among components in the display driving integrated circuit and a second reset signal to maintain an operation of the at least one first component while initializing the at least one second component, based on the control signal, the display driving integrated circuit may be configured to initialize the display driving integrated circuit by initializing the at least one second component, based on the first reset signal, and the synchronization signal generator may be configured to maintain the transmission of the at least one synchronization signal to the touch sensor controller every specified period while initializing the display driving integrated circuit by operating based on the second reset signal. In some embodiments, the at least one first component may further include a clock signal generator configured to generate a clock signal, based on the second reset signal, and the synchronization signal generator may be configured to maintain the transmission of the at least one synchronization signal to the touch sensor controller every specified period while initializing the display driving integrated circuit by operating based on the clock signal.

According to various embodiments, the display driving integrated circuit and the synchronization signal generator may be designed as a single display driving integrated circuit chip.

According to various embodiments, the display driving integrated circuit may be designed as a first chip, and the synchronization signal generator may be designed as a second chip distinct from the first chip.

According to various embodiments, the at least one synchronization signal may include a vertical synchronization signal associated with the touch sensor controller and a horizontal synchronization signal associated with the touch sensor controller.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising:
   a display panel;
   a display driving integrated circuit (DDIC) configured to be operably coupled to the display panel;
   a touch sensor; and
   a touch sensor controller configured to be operably coupled to the display driving integrated circuit and the touch sensor,
   wherein the display driving integrated circuit is configured to:
   perform multiple transmissions of a synchronization signal for synchronizing an operation of the display driving integrated circuit with an operation of the touch sensor controller to the touch sensor controller within one frame, based on a first transmission mode when the display panel is controlled based on a first frame rate; and
   perform multiple transmissions of the synchronization signal to the touch sensor controller within the frame, based on a second transmission mode when the display panel is controlled based on a second frame rate,
   time intervals between the multiple transmissions based on the first transmission mode are the same, and
   a first time interval between a first transmission and a second transmission subsequent to the first transmission among the multiple transmissions based on the second transmission mode is different from remaining time intervals excluding the first time interval among time intervals between the multiple transmissions based on the second transmission mode.

2. The electronic device as claimed in claim 1, wherein a last transmission among the multiple transmissions based on the first transmission mode is performed at an end timing of the frame, and a last transmission among the multiple transmissions based on the second transmission mode is performed at the end timing of the frame.

3. The electronic device as claimed in claim 1, wherein the second frame rate is lower than the first frame rate, and the display driving integrated circuit is configured to extend a vertical porch (V-porch) of a vertical synchronization signal associated with the first frame rate and to control the display panel, based on the second frame rate associated with a vertical synchronization signal based on the extended vertical porch.

4. The electronic device as claimed in claim 1, wherein the touch sensor controller is configured to detect an input to the touch panel, based on a timing when the synchronization signal is received.

5. The electronic device as claimed in claim 4, wherein the touch sensor controller is configured to comprise an analog front end (AFE) and a digital signal processor, to obtain an analog signal with respect to the input using the analog front end at the timing when the synchronization signal is received, and to generate coordinate information about the input by providing a digital signal, converted from the analog signal, to the digital signal processor.

6. The electronic device as claimed in claim 5, wherein a timing when an operation of the analog front end obtaining the analog signal is completed is within an operating cycle of the touch sensor controller.

7. The electronic device as claimed in claim 4, wherein the touch sensor controller is configured to comprise an analog front end (AFE) and a digital signal processor, to obtain an analog signal with respect to the input using the analog front end after a lapse of a specified time interval from when the synchronization signal is received, and to generate coordinate information about the input by providing a digital signal, converted from the analog signal, to the digital signal processor.

8. The electronic device as claimed in claim 1, wherein an operating frequency of the touch sensor controller is a multiple of the first frame rate.

9. An electronic device comprising:
   a touch sensor controller configured to be operably coupled to a touch panel;
   a display driving integrated circuit configured to be operably coupled to the touch sensor controller and a display panel;
   a synchronization signal generator configured to generate at least one synchronization signal associated with the touch sensor controller and to be associated with the display driving integrated circuit; and
   a processor configured to be operably coupled to the display driving integrated circuit,
   wherein the synchronization signal generator is configured to transmit the at least one synchronization signal to the touch sensor controller every specified period,
   the processor is configured to detect an input to change a driving mode of the display panel and to transmit a control signal to initialize the display driving integrated circuit to the display driving integrated circuit upon detecting the input,
   the display driving integrated circuit is configured to initialize the display driving integrated circuit, based on the control signal, and
   the synchronization signal generator is further configured to maintain transmission of the at least one synchronization signal to the touch sensor controller every specified period while initializing the display driving integrated circuit.

10. The electronic device as claimed in claim 9, wherein the processor is configured to detect the input to change the driving mode of the display panel from a normal mode to an always-on-display (AOD) mode.

11. The electronic device as claimed in claim 9, wherein the synchronization signal generator is comprised in the display driving integrated circuit,
the display driving integrated circuit further comprises a reset signal generator,
the reset signal generator is configured to generate a first reset signal to initialize at least one second component other than at least one first component associated with the synchronization signal generator among components in the display driving integrated circuit and a second reset signal to maintain an operation of the at least one first component while initializing the at least one second component, based on the control signal,
the display driving integrated circuit is configured to initialize the display driving integrated circuit by initializing the at least one second component, based on the first reset signal, and
the synchronization signal generator is configured to maintain the transmission of the at least one synchronization signal to the touch sensor controller every specified period while initializing the display driving integrated circuit by operating based on the second reset signal.

12. The electronic device as claimed in claim 11, wherein the at least one first component further comprises a clock signal generator configured to generate a clock signal, based on the second reset signal, and
the synchronization signal generator is configured to maintain the transmission of the at least one synchronization signal to the touch sensor controller every specified period while initializing the display driving integrated circuit by operating based on the clock signal.

13. The electronic device as claimed in claim 9, wherein the display driving integrated circuit and the synchronization signal generator are designed as a single display driving integrated circuit chip.

14. The electronic device as claimed in claim 9, wherein the display driving integrated circuit is designed as a first chip, and
the synchronization signal generator is designed as a second chip distinct from the first chip.

15. The electronic device as claimed in claim 9, wherein the at least one synchronization signal comprises a vertical synchronization signal associated with the touch sensor controller and a horizontal synchronization signal associated with the touch sensor controller.

\* \* \* \* \*